(12) United States Patent
Cevahir

(10) Patent No.: US 10,140,342 B2
(45) Date of Patent: Nov. 27, 2018

(54) SIMILARITY CALCULATION SYSTEM, METHOD OF CALCULATING SIMILARITY, AND PROGRAM

(71) Applicant: Rakuten, Inc., Tokyo (JP)

(72) Inventor: Ali Cevahir, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 246 days.

(21) Appl. No.: 15/028,439

(22) PCT Filed: Jun. 30, 2014

(86) PCT No.: PCT/JP2014/067465
§ 371 (c)(1),
(2) Date: Apr. 11, 2016

(87) PCT Pub. No.: WO2016/001998
PCT Pub. Date: Jan. 7, 2016

(65) Prior Publication Data
US 2016/0321265 A1    Nov. 3, 2016

(51) Int. Cl.
*G06F 17/30* (2006.01)

(52) U.S. Cl.
CPC .... *G06F 17/3053* (2013.01); *G06F 17/30598* (2013.01)

(58) Field of Classification Search
CPC .................. G06F 17/3053; G06F 17/30598
USPC ....................................................... 707/737
See application file for complete search history.

(56) References Cited

U.S. PATENT DOCUMENTS

| | | | |
|---|---|---|---|
| 2003/0021481 A1* | 1/2003 | Kasutani | G06F 17/30247 382/218 |
| 2003/0105589 A1* | 6/2003 | Liu | G06F 17/30017 702/1 |
| 2010/0046842 A1* | 2/2010 | Conwell | G06F 17/30265 382/218 |
| 2012/0143856 A1* | 6/2012 | Klinkigt | G06K 9/4671 707/723 |

(Continued)

FOREIGN PATENT DOCUMENTS

JP    2013-065146 A    4/2013

OTHER PUBLICATIONS

Cambazoglu, B.B., Catal, A., Aykanat, C., "Effect of Inverted Index Partitioning Schemes on Performance of Query Processing in Parallel Text Retrieval Systems", Proc. of the 21st International Conference on Computer and Information Sciences (ISCIS'06), LNCS, vol. 4263, pp. 717-725, 2006.

*Primary Examiner* — James Trujillo
*Assistant Examiner* — Jessica N Le
(74) *Attorney, Agent, or Firm* — HEA Law PLLC

(57) ABSTRACT

Provided is a similarity calculation system for equalizing the time for calculating a similarity between target vectors and a query vector. The similarity calculation system includes target vector acquisition part for acquiring a plurality of target vectors, and clustering part for clustering the plurality of target vectors based on a calculation amount to be estimated for each of the plurality of target vectors, the calculation amount being estimated when calculating a similarity between each of the plurality of target vectors and a given reference query vector, so that a difference in total calculation amount for a similarity between all of the target vectors belonging to each of a plurality of clusters and the given reference query vector among the plurality of clusters decreases.

6 Claims, 9 Drawing Sheets

(56) References Cited

U.S. PATENT DOCUMENTS

| | | | |
|---|---|---|---|
| 2014/0126830 A1* | 5/2014 | Suganuma | G06K 9/627 382/225 |
| 2014/0267301 A1* | 9/2014 | Yang | G09G 5/24 345/467 |
| 2015/0052139 A1 | 2/2015 | Cevahir et al. | |

* cited by examiner

FIG.4

|    | c1 | c2 | c3 | c4 | c5 | c6 | c7 | c8 | c9 | c10 |
|----|----|----|----|----|----|----|----|----|----|-----|
| r1 | 1  |    |    | 2  |    |    |    |    |    |     |
| r2 | 3  |    | 1  |    |    |    | 1  |    |    |     |
| r3 | 1  | 1  |    | 2  |    |    |    |    | 1  |     |
| r4 |    |    |    |    | 4  |    | 1  | 1  |    | 1   |
| r5 | 1  |    |    |    |    |    |    |    | 2  | 2   |
| r6 |    |    |    | 1  |    | 1  |    | 1  |    |     |

|  | weight |
|---|---|
| r1 | 2 |
| r2 | 3 |
| r3 | 4 |
| r4 | 4 |
| r5 | 3 |
| r6 | 3 |
| c1 | 0 |
| c2 | 0 |
| ⋮ | ⋮ |
| c10 | 0 |

|    |    | cost |
|----|----|------|
| r1 | c1 | $1 \times \log(6/4)$ |
| r1 | c4 | $2 \times \log(6/3)$ |
| r2 | c1 | $3 \times \log(6/4)$ |
| r2 | c3 | $1 \times \log(6/1)$ |
| ⋮  | ⋮  | ⋮    |

FIG.10

| CLUSTER | TARGET VECTOR |
|---|---|
| P1 | r1,r2,r3 |
| P2 | r4,r5,r6 |

FIG.11

| CLUSTER | ELEMENT TYPE | PAIR CONSISTING OF TARGET VECTOR AND ELEMENT VALUE |
|---|---|---|
| P1 | c1 | (r1,1), (r2,3), (r3,1) |
| P1 | c2 | (r3,1) |
| P1 | c3 | (r2,1) |
| P1 | c4 | (r1,2), (r3,2) |
| P1 | c5 | |
| ⋮ | ⋮ | ⋮ |
| P2 | c1 | (r5,1) |
| P2 | c2 | |
| ⋮ | ⋮ | ⋮ |

FIG.12

| CLUSTER | ELEMENT TYPE |
|---|---|
| P1 | c1,c2,c3,c4 |
| P2 | c5,c6,c7,c8,c9,c10 |

SIMILARITY CALCULATION SYSTEM, METHOD OF CALCULATING SIMILARITY, AND PROGRAM

CROSS REFERENCE TO RELATED APPLICATIONS

This application is a National Stage of International Application No. PCT/JP2014/067465 filed on Jun. 30, 2014. The contents of the above document is incorporated herein by reference in its entirety.

TECHNICAL FIELD

The present invention relates to a similarity calculation system, a method of calculating a similarity, and a program.

BACKGROUND ART

There are similarity calculation systems configured to calculate which of a plurality of target vectors is similar to a given query vector. Such a system may be used, for example, to search for users having a similar preference by setting so that each vector represents a preference of a user, or to search for similar documents by setting so that each vector represents a characteristic of a document.

In this case, when there are a large number of target vectors, it takes time to determine the target vector that is most similar to the query vector. In order to solve this problem, in Patent Literature 1, there is disclosed a method in which the target vectors are clustered and a representative vector is calculated for each cluster. According to the method, when a query vector is given, a similarity between the query vector and each representative vector is calculated, and the most similar cluster is selected based on the calculated result. Further, the target vector most similar to the query vector is determined by calculating the similarity between each of the target vectors belonging to the selected cluster and the query vector.

CITATION LIST

Patent Literature

[PTL 1] JP 2013-065146 A

SUMMARY OF INVENTION

Technical Problem

According to the above-mentioned related art, a cluster is selected, then the similarity to a query vector is calculated for all of the target vectors belonging to the selected cluster, and the target vector having the largest similarity is selected. However, the total calculation costs of the estimation may be greatly different for each cluster. As a result, depending on the content of the query vector, the time taken until determining the target vector most similar to the query vector may greatly vary for each cluster.

The present invention has been created in view of the problem described above. It is an object of the present invention to provide a similarity calculation system, a method of calculating a similarity, and a program, which are capable of equalizing the processing time for selecting a target vector similar to a query vector.

Solution to Problem

In order to solve the above-mentioned problem, a similarity calculation system according to one embodiment of the present invention includes: target vector acquisition means for acquiring a plurality of target vectors; and clustering means for clustering the plurality of target vectors based on a calculation amount to be estimated for each of the plurality of target vectors, the calculation amount being estimated when calculating a similarity between each of the plurality of target vectors and a query vector.

Further, a method of calculating a similarity according to one embodiment of the present invention includes the steps of: acquiring a plurality of target vectors; and clustering the plurality of target vectors based on a calculation amount to be estimated for each of the plurality of target vectors, the calculation amount being estimated when calculating a similarity between each of the plurality of target vectors and a query vector.

Further, a program according to one embodiment of the present invention causes a computer to execute the processing of: acquiring a plurality of target vectors; and clustering the plurality of target vectors based on a calculation amount to be estimated for each of the plurality of target vectors, the calculation amount being estimated when calculating a similarity between each of the plurality of target vectors and a query vector.

In one aspect of the present invention, the clustering means may cluster the plurality of target vectors so that a difference in total calculation amount among a plurality of clusters decreases, the total calculation amount being estimated for each of the plurality of clusters based on a calculation amount estimated for each of the plurality of target vectors belonging to the each of the plurality of clusters.

According to the one embodiment of the present invention, when classifying a plurality of target vectors into a plurality of clusters, and selecting the target vectors similar to a query vector for any one of the clusters, the time for calculating the similarity between each of the target vectors and the query vector can be equalized.

In one aspect of the present invention, the similarity calculation system may further include estimated calculation amount calculation means for calculating, for each of the plurality of target vectors, a calculation amount to be estimated when calculating the similarity between the each of the plurality of target vectors and the query vector, and the clustering means may cluster the plurality of target vectors so that a difference in total sum of the calculated calculation amounts for all of the plurality of target vectors belonging to each of the plurality of clusters among the plurality of clusters decreases.

In one aspect of the present invention, in the similarity calculation system, the estimated calculation amount calculation means may calculate a number of non-zero elements of each of the plurality of target vectors as the estimated calculation amount.

In one aspect of the present invention, the similarity calculation system may further include: query vector acquisition means for acquiring a query vector; and similarity calculation means for calculating the similarity between each of the plurality of target vectors belonging to any one of the plurality of clusters and the query vector.

In one aspect of the present invention, the clustering means may cluster the plurality of target vectors by generating a graph including a plurality of first nodes that correspond to each of the plurality of target vectors and that has the calculation amount estimated for a corresponding one of the plurality of target vectors as a weight, a plurality of second nodes corresponding to an element type of the plurality of target vectors, and a plurality of edges connecting each of the plurality of first nodes to any one of the plurality of second nodes, and by dividing the generated graph based on the weight of each of the plurality of first nodes.

In one aspect of the present invention, each of the plurality of edges may include a cost that is based on a value of an element of the target vector corresponding to a corresponding one of the plurality of edges, and the clustering means may cluster the plurality of target vectors by dividing the generated graph based further on the cost of each of the plurality of edges.

In one aspect of the present invention, the similarity calculation system may further include cluster selection means for selecting, based on the element type corresponding to the second node classified into the plurality of clusters by the clustering means and on the query vector including a plurality of elements, the cluster for which the similarity between the query vector and each of the plurality of target vectors is to be calculated, and the similarity calculation means may calculate the similarity between each of the plurality of target vectors belonging to the cluster selected by the cluster selection means and the query vector.

BRIEF DESCRIPTION OF DRAWINGS

FIG. 4 is a diagram for showing an example of data representing a plurality of target vectors.

FIG. 10 is a diagram for showing an example of information on clusters to which characteristic vectors belong.

FIG. 11 is a diagram for showing an example of an inverted index.

FIG. 12 is a diagram for showing an example of information on a cluster to which an element type belongs.

DESCRIPTION OF EMBODIMENTS

Figure 1:
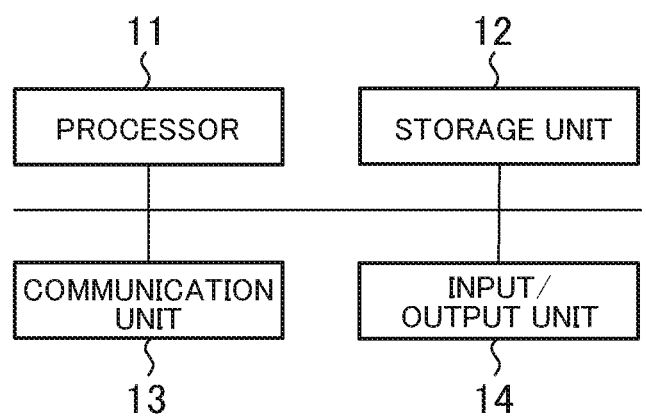
FIG. 1 is a diagram for illustrating an example of a hardware configuration of a similarity search server according to one embodiment of the present invention.

An embodiment of the present invention is now described with reference to the drawings. Constituent elements in the following description having the same function as each other are denoted with the same reference characters, and a duplicate description of such constituent elements is omitted.

A similarity search system according to one embodiment of the present invention includes a similarity search server. The similarity search server is a server computer. The similarity search server may be connected via a network to a personal computer, a smartphone, and the like, which is configured to issue an instruction to start a similarity search.

FIG. 1 is a diagram for illustrating an example of a hardware configuration of the similarity search server. The similarity search server includes a processor 11, a storage unit 12, a communication unit 13, and an input/output unit 14.

The processor 11 is configured to operate based on programs stored in the storage unit 12. Further, the processor 11 is configured to control the communication unit 13 and the input/output unit 14. Note that, the above-mentioned programs may be provided via the Internet and the like, or may be provided by being stored in a computer-readable storage medium, such as a flash memory or a digital versatile disc read-only memory (DVD-ROM).

The storage unit 12 is constructed from a memory element, such as a random-access memory (RAM) or a flash memory, or from a hard disk drive. The storage unit 12 stores the above-mentioned programs. Further, the storage unit 12 stores information input from various units and calculation results.

The communication unit 13, which realizes a function for communicating to/from another apparatus, is constructed from, for example, an integrated circuit, a connector terminal, and the like of a wired local area network (LAN). The communication unit 13 is configured to, under the control of the processor 11, input information received from another apparatus to the processor 11 and the storage unit 12, and transmit information to another apparatus.

The input/output unit 14 is constructed from, for example, a video controller configured to control display output means and a controller configured to acquire data from an input device. Examples of the input device include a keyboard, a mouse, a touch panel, and the like. The input/output unit 14 is configured to, under the control of the processor 11, output display data to a display output device, and acquire data input by a user operating the input device. The display output device is, for example, an externally connected display apparatus.

Figure 2:
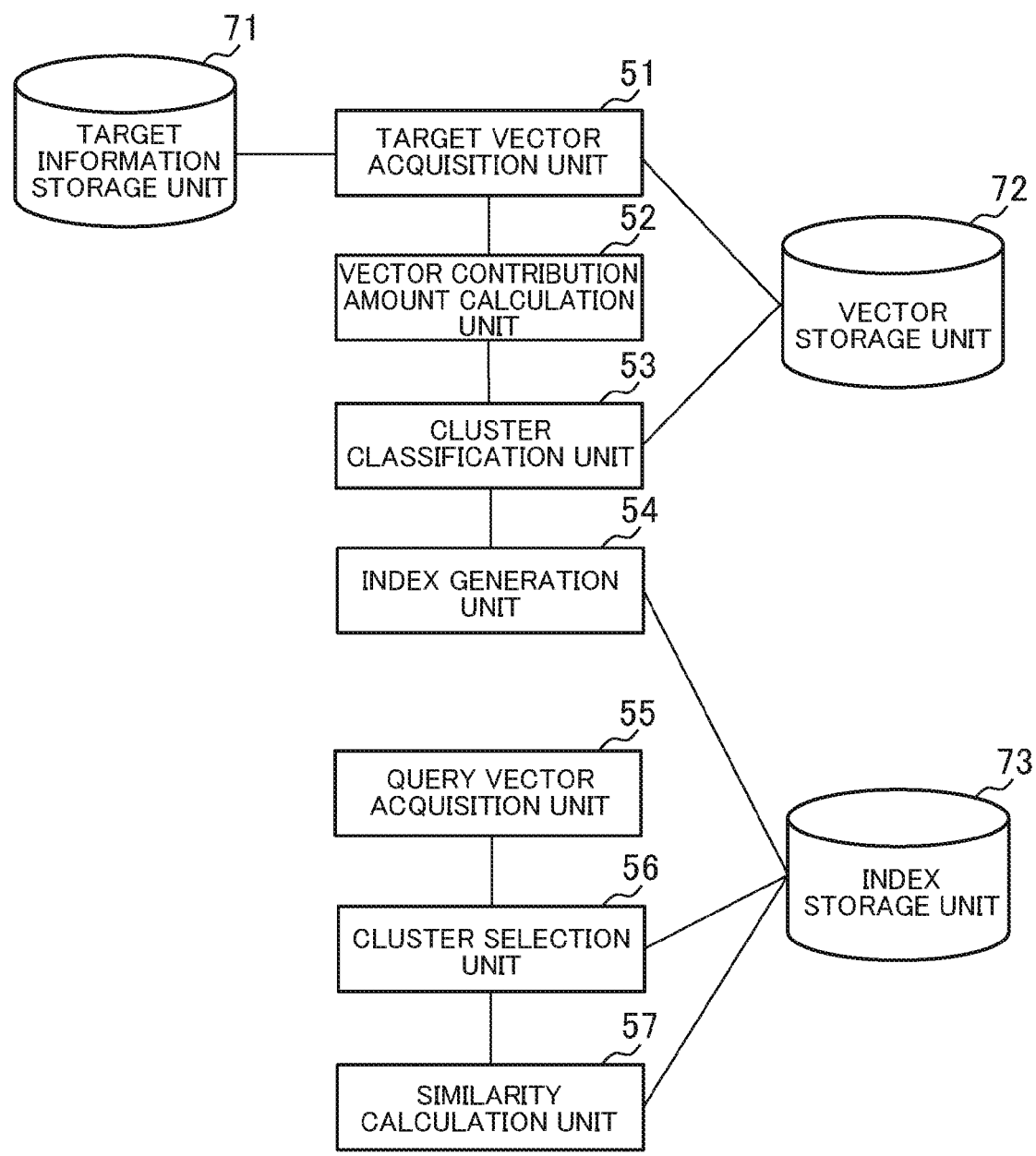
FIG. 2 is a block diagram for illustrating functions realized by the similarity search server.

FIG. 2 is a block diagram for illustrating functions realized by the similarity search server. Functionally, the similarity search server includes a target vector acquisition unit 51, a vector contribution amount calculation unit 52, a cluster classification unit 53, an index generation unit 54, a query vector acquisition unit 55, a cluster selection unit 56, and a similarity calculation unit 57. Those functions are provided by the processor 11 executing a program stored in the storage unit 12, and controlling the communication unit 13 and the input/output unit 14. Further, the similarity search server includes a target information storage unit 71, a vector storage unit 72, and an index storage unit 73.

The target information storage unit 71 stores information on a document, the user, and the like, on which the similarity search is to be carried out. The vector storage unit 72 stores a plurality of target vectors. The index storage unit 73 stores information to be used as an index when searching for target vectors using a query vector serving as a search condition. In this case, each of the target vectors is a characteristic vector generated based on the corresponding information on the document, the user, and the like. The target information storage unit 71, the vector storage unit 72, and the index storage unit 73 are mainly constructed from the storage unit 12. However, those storage units may be constructed from a storage unit in another server, and the stored information may be exchanged via a network with each of the functions in the similarity search server.

This embodiment performs processing for searching for target vectors that are similar to the query vector, and processing for creating a search index by classifying the target vectors into clusters in order to carry out the search. The former processing is performed by the query vector acquisition unit 55, the cluster selection unit 56, and the similarity calculation unit 57. The latter processing is performed by the target vector acquisition unit 51, the vector contribution amount calculation unit 52, the cluster classification unit 53, and the index generation unit 54.

Figure 3:
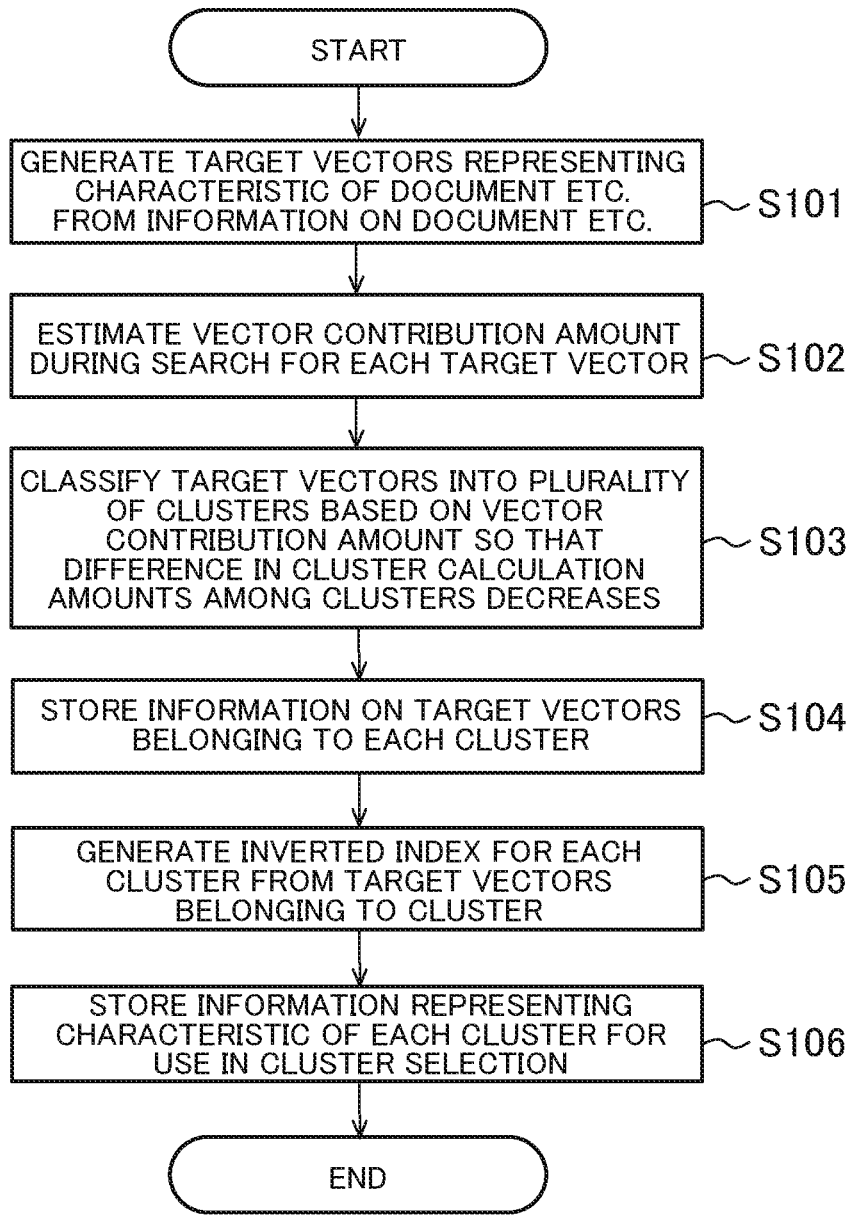
FIG. 3 is a flowchart for illustrating an example of processing for creating an index by classifying target vectors into a plurality of clusters.

FIG. 3 is a flowchart for illustrating an example of processing for creating an index by classifying target vectors into a plurality of clusters. The target vector acquisition unit 51, the vector contribution amount calculation unit 52, the cluster classification unit 53, and the index generation unit 54 are now described along with this processing flow.

The target vector acquisition unit 51 is mainly realized by the processor 11 and the storage unit 12. The target vector acquisition unit 51 is configured to acquire a plurality of target vectors. More specifically, the target vector acquisition unit 51 generates target vectors representing a characteristic of a document, the user, and the like based on information on the document, the user, and the like stored in the target information storage unit 71 (Step S101). Further, the target vector acquisition unit 51 stores the generated target vectors in the vector storage unit 72. For example, when target vectors are generated based on an electronic document, the target vectors correspond to a document, and each of a plurality of elements included in the target vectors corresponds to a single term. Note that, the number of dimensions of the target vectors is the same as the number of elements of the target vectors. Further, the values of the elements of the target vectors are a score representing an appearance frequency of the term in the corresponding document (e.g., TF or TF-IDF).

The TF (term frequency) is the appearance frequency of the term, and the IDF (inverse document frequency) is a value that decreases when there are a larger number of documents that the term appears in. The TF-IDF value for a given term in a given document is 0 when that term does not appear in the document. Further, even if a term appears in a document, if the term is considered to be a common term that appears in many documents, the TF-IDF value is smaller than when the term is not a common term. The target vectors may also be generated based on each of a plurality of pieces of user information. In this case, the elements of the target vectors may correspond to an attribute (information representing an attribute of the user) of the user information. When the attribute is capable of taking a plurality of values, an element corresponding to each value of the attribute may exist. Because specific methods of generating target vectors based on a document or a user attribute are known, a detailed description thereof is omitted here.

FIG. 4 is a diagram for showing an example of data representing a plurality of target vectors. The plurality of rows included in the table shown in FIG. 4 represent a target vector r1 to r6, and the columns represent an element (component) c1 to c10 of the target vectors. In this case, the number of target vectors is 6, and the number of components of each target vector is 10. However, the actual number of target vectors and components may be larger. Further, a TF value is set for the elements of the target vectors shown in FIG. 4. The fact that the number 1 is in the cell at row r1, column c1, shows that the value of the element c1 of the target vector r1 is 1. The fact that no number is in the cell at row r1, column c2, shows that the value of the element c1 of the target vector r1 is 0. When using the target vectors shown in FIG. 4, during the processing in which the cluster classification unit 53 classifies the target vectors into clusters, and the processing in which the similarity calculation unit 57 searches for target vectors, a TF-IDF score calculated based on the TF may be used. Note that, if the value of a target vector element is already a TF-IDF score, it is not necessary to calculate the TF-IDF score based on the TF.

The vector contribution amount calculation unit 52 is mainly realized by the processor 11 and the storage unit 12. The vector contribution amount calculation unit 52 is configured to, for each of the plurality of generated target vectors, calculate a vector contribution amount, which is a calculation amount obtained by estimating the contribution of a target vector to a calculation amount (also referred to as cluster calculation amount) estimated when the similarity calculation unit 57 searches for target vectors that are similar to a query vector for a given cluster (Step S102). The vector contribution amount is a calculation amount estimated for each of the plurality of target vectors, which is estimated when calculating the similarity between each of the plurality of target vectors and the query vector. The cluster calculation amount of each cluster is a sum of the vector contribution amounts of the plurality of target vectors belonging to the cluster.

When the similarity calculation unit 57 calculates the similarity between the query vector and the target vectors using a so-called inverted index, the vector contribution amount calculation unit 52 may, for example, calculate the number of non-zero elements included in the target vectors as the vector contribution amount of those target vectors. Further, the vector contribution amount calculation unit 52 may calculate the sum of the values of the elements of a reference query vector corresponding to the non-zero elements included in the target vectors as the estimated vector contribution amount of those target vectors. In this case, 1 may be set for each element of the reference query vector, or a value based on the probability of a non-zero value appearing in the elements of the query vector may be set for each element of the reference query vector. Setting the number of non-zero elements as the vector contribution amount is equivalent to calculating the vector contribution amount for a case in which the similarity between the target vectors and the reference query vector is calculated by setting 1 for each of the elements of the reference query vector.

Note that, when the similarity calculation unit 57 determines the similarity by calculating the inner product between the target vectors and the query vector for each of the target vectors, the vector contribution amount calculation unit 52 may acquire a fixed value as the vector contribution amount regardless of the target vector.

The cluster classification unit 53 is mainly realized by the processor 11 and the storage unit 12. The cluster classification unit 53 is configured to classify the plurality of target vectors into clusters based on the calculation amount (which corresponds to the vector contribution amount) of the similarity for each of the plurality of target vectors during the search for target vectors similar to the query vector. Stated further, the cluster classification unit 53 classifies the plurality of target vectors into a plurality of clusters based on the vector contribution amount so that a difference among the clusters in calculation amounts (cluster calculation amounts) estimated when searching for target vectors similar to the query vector for each of the clusters decreases (Step S103).

Decreasing the difference in cluster calculation amounts among the clusters may be carried out, for example, so that the dispersion (variance etc.) of cluster calculation amounts for the plurality of classified clusters is less than an upper limit. Decreasing the difference in cluster calculation amounts among the clusters may also be carried out, for example, simply so that the cluster calculation amounts of all of the clusters are within a permissible range. In this case, the permissible range may be determined based on the sum of the vector contribution amounts of a plurality of vectors, for example. In this embodiment, cases in which the dispersion of cluster calculation amounts is less than an upper limit and in which the cluster calculation amounts are within a permissible range are referred to as "satisfying the dispersion condition". Further, decreasing the difference in cluster calculation amounts among the clusters may be carried out so that a difference between a minimum value and a maximum value of the cluster calculation amounts of the finally-classified clusters is smaller than a difference among the clusters in which the plurality of vectors are classified as an initial condition.

Figure 5:
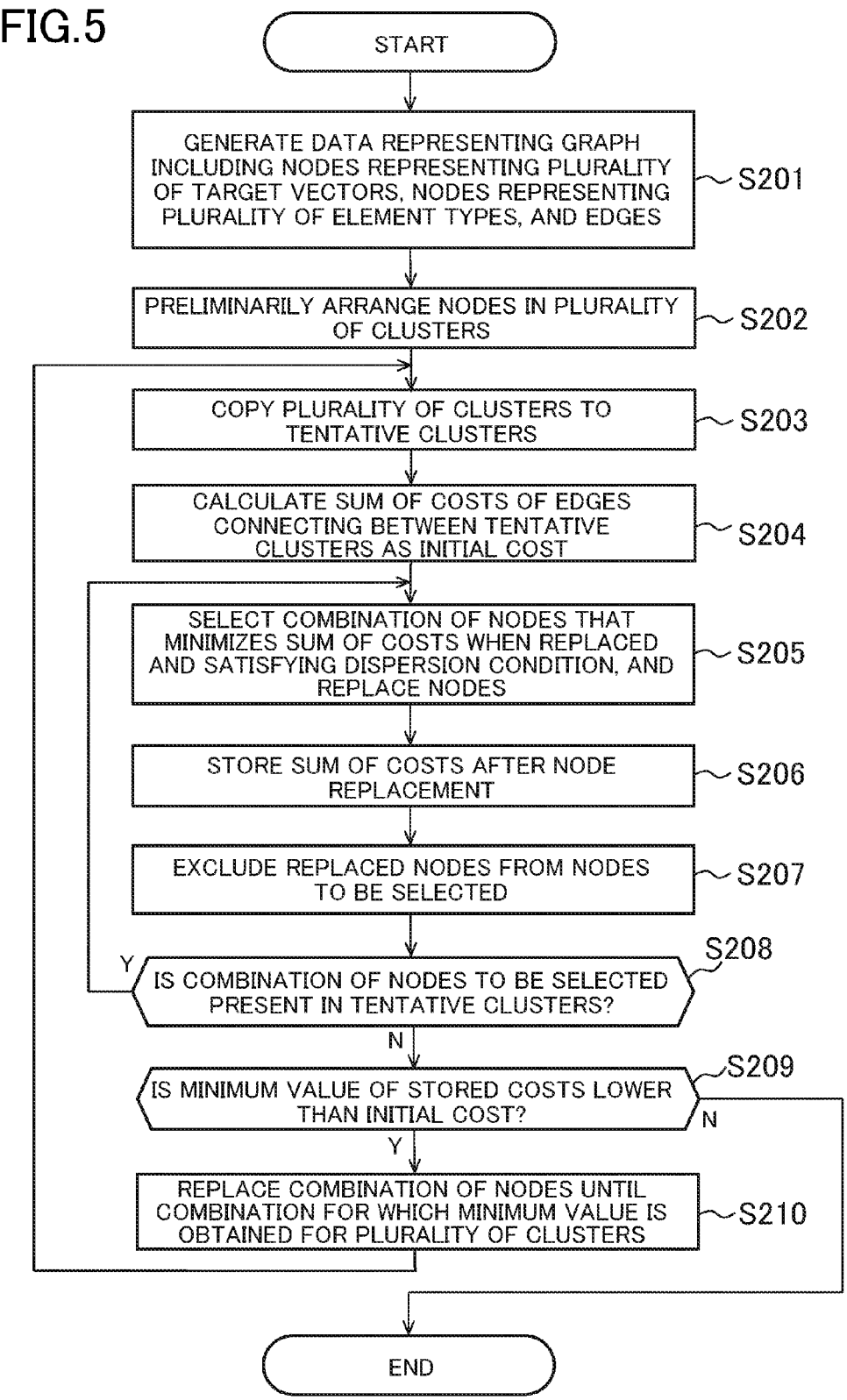
FIG. 5 is a flowchart for illustrating an example of processing by a cluster classification unit.

FIG. 5 is a flowchart for illustrating an example of processing by the cluster classification unit 53. In the processing illustrated in FIG. 5, the cluster classification unit 53 generates a graph for showing a plurality of characteristic vectors, and divides the graph into a plurality of clusters. The nodes included in the clusters represent a characteristic vector included in those clusters. This processing is described in more detail below.

First, the cluster classification unit 53 generates data representing a graph that includes a plurality of nodes representing a plurality of target vectors, a plurality of nodes representing a plurality of element types, and a plurality of edges (Step S201). The graph generated by the cluster classification unit 53 in this processing is a bipartite graph. In the bipartite graph, the target vectors and the nodes representing the target vectors correspond to each other in a one-to-one relationship, and the element types of the target vectors and the nodes representing the element types also correspond to each other in a one-to-one relationship. Further, a weight of each of the plurality of nodes representing the target vectors is the vector contribution amount of the corresponding target vector, and the weight of the plurality of nodes representing the element type is 0.

In addition, an edge is arranged between the nodes corresponding to each of the plurality of target vectors and the nodes corresponding to non-zero element types included in those target vectors. The number of edges is the sum of the number of non-zero elements included in the plurality of generated target vectors. When the node of a target vector connected to an edge is referred to as a vector node, and the node of the element type connected to that edge is referred to as an element node, a value based on the value of the element corresponding to the element node for the target vector corresponding to the vector node is the cost of the edge. For example, when the value of the element of the target vector is in terms of TF, the TF-IDF score calculated based on the value of that element is the cost of the edge. When the value of the element of the target vector is in terms of TF-IDF, the value of the element itself is the cost of the edge.

Figures 6, 7:
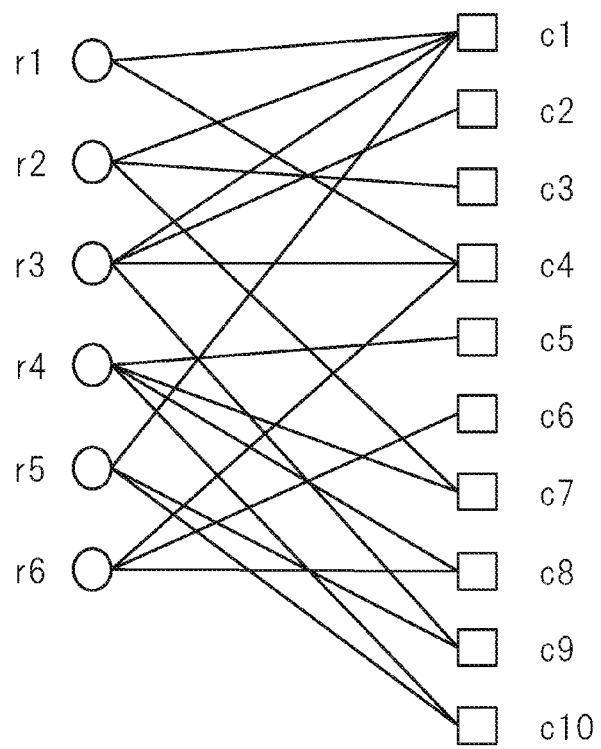
FIG. 6 is a diagram for showing an example of a generated bipartite graph.
FIG. 7 is a diagram for showing an example of a weight of a plurality of nodes.

FIG. 6 is a diagram for showing an example of a generated bipartite graph. In FIG. 6, the bipartite graph generated based on the plurality of target vectors shown in FIG. 4 is shown. The bipartite graph includes six nodes, which respectively correspond to the target vectors r1 to r6, and ten nodes c1 to c10, which respectively correspond to element types c1 to c10. For example, the node corresponding to the target vector r1 is connected by an edge to the non-zero elements c1 and c4 among the elements included in the target vector r1. The bipartite graph generated by the cluster classification unit 53 does not include any edges connecting nodes corresponding to target vectors to each other, or edges connecting nodes corresponding to element types to each other.

FIG. 7 is a diagram for showing an example of a weight of a plurality of nodes. In FIG. 7, an example of a node weight determined based on the target vectors shown in FIG. 4 is shown. The example is for a case in which the vector contribution amount is set as the number of non-zero elements that the target vectors include. The weight of the target vector r1 is 2, which is the number of non-zero elements that the target vector r1 includes. The weight of the other target vectors is also the number of non-zero elements that the corresponding target vector includes. On the other hand, the weight of the element types c1 to c10 is 0.

Figures 8, 9:
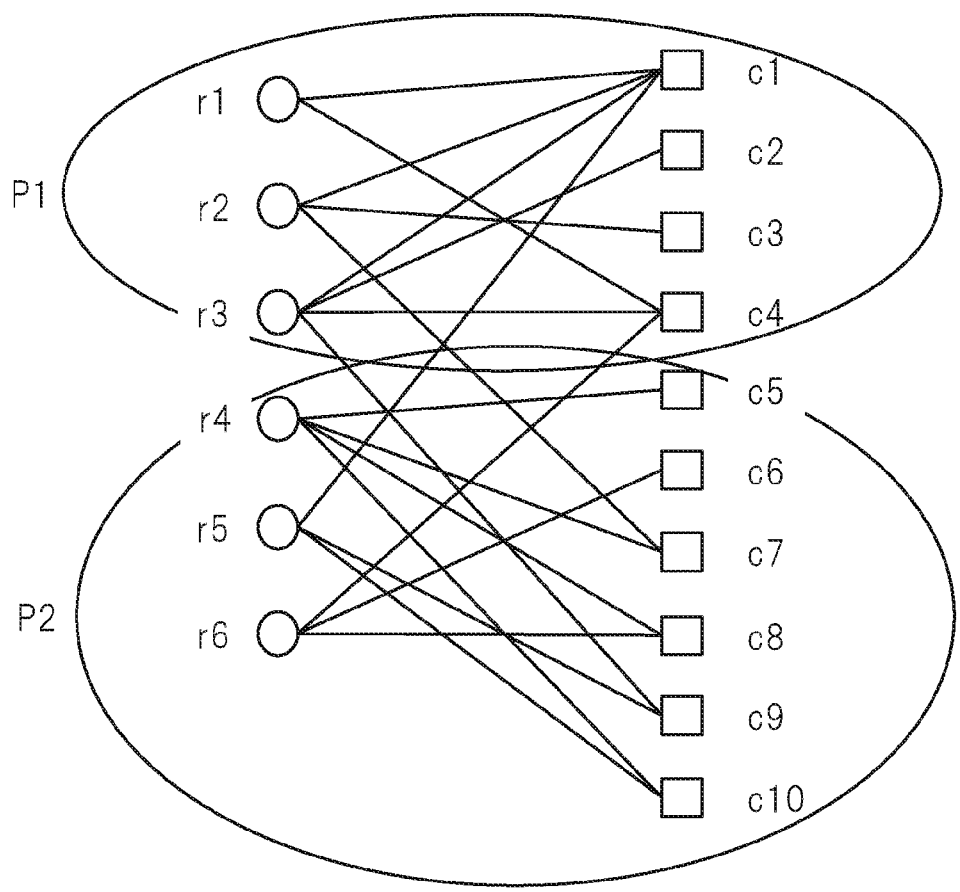
FIG. 8 is a diagram for showing an example of a cost of an edge.
FIG. 9 is a diagram for showing an example of a plurality of nodes classified into clusters.

FIG. 8 is a diagram for showing an example of a cost of an edge. In FIG. 8, the cost of the edges determined based on the target vectors shown in FIG. 4 is shown. In this case, the cost of the edge between the node corresponding to the target vector r1 and the node corresponding to the element type c1 is a value obtained by multiplying the value of the IDF score of the element type c1 by 1, which is the value of the TF of the element c1 of the target vector r1. The cost of the other edges is similarly determined based on the value of the element of the target vector corresponding to the edge.

Note that, instead of a bipartite graph, the cluster classification unit 53 may generate a graph having edges connecting two nodes corresponding to target vectors. In this case, the edge weight may be the distance between the two target vectors connected by an edge, and nodes corresponding to the element types may be absent.

When the graph has been generated, the cluster classification unit 53 preliminarily arranges the nodes in the plurality of clusters (Step S202). In this case, the cluster classification unit 53 arranges a plurality of nodes in the clusters so that the dispersion of the sums of the weights of the plurality of nodes included in the clusters in which the nodes have been preliminarily arranged satisfies the dispersion condition. The number of clusters may be 2, or may be 3 or more. The cluster classification unit 53 may rank the nodes based on the weight size, and arranges the first to k-th nodes in the first to k-th clusters. Then, the nodes may be arranged in the clusters so that the dispersion condition is satisfied by repeating a process in which the nodes are arranged in order in the cluster having the smallest weight sum. The nodes may also be arranged in the clusters by repeating a process in which the nodes are randomly arranged in the plurality of clusters until the dispersion condition is satisfied.

When the nodes have been preliminarily arranged in the clusters, the cluster classification unit 53 determines the finally-divided graph by iteratively correcting the arrangement of the nodes using the Kernighan-Lin algorithm. The clusters in the finally-divided graph correspond to the clusters in which the target vectors have been classified.

Specifically, first, the cluster classification unit 53 copies the plurality of clusters to a plurality of tentative clusters (Step S203). As a result, the nodes belonging to the plurality of tentative clusters are the same as the nodes belonging to the corresponding clusters. Next, the cluster classification unit 53 calculates the sum of the costs of the edges between nodes belonging to different tentative clusters from each other as an initial cost (Step S204). The sum of the costs of the edges between nodes belonging to different tentative clusters from each other is referred to below as simply the "sum of costs".

Then, the cluster classification unit 53 selects a combination of two nodes, and replaces those nodes (Step S205). In this case, the selected combination of nodes is the combination of two nodes belonging to different clusters from each other that minimizes the sum of costs when the two nodes are replaced and that satisfies the dispersion condition. The cluster classification unit 53 then stores the sum of costs after the nodes have been replaced (Step S206). Further, the replaced nodes are excluded from the nodes that may be selected as the combination of nodes in Step S205 (Step S207). When the combination of nodes to be selected is present in the plurality of tentative clusters (Y in Step S208), the processing from Step S205 is repeated. When the combination of nodes is no longer present (N in Step S208), the cluster classification unit 53 determines whether or not the minimum value of the costs stored this time in the loop from Step S205 to Step S208 is lower than the initial cost (Step S209). When the minimum value is less than the initial cost (Y in Step S209), the cluster classification unit 53 replaces, of the nodes included in the plurality of clusters that are not tentative clusters, the plurality of nodes corresponding to the combination corresponding to the minimum value and the combination selected from Step S205 to Step S208 before selecting the combination corresponding to the minimum value with each other (Step S210). On the other hand, when the minimum value is equal to or more than the initial cost (N in Step S209), the processing for classifying into clusters is finished. The clusters at the point when the processing is finished become the clusters for which nodes have been classified.

FIG. 9 is a diagram for showing an example of a plurality of nodes classified into clusters. In FIG. 9, an example for a case in which the nodes of the graph shown in FIG. 6 to FIG. 8 have been classified into two clusters, P1 and P2, is shown. In the cluster P1, the nodes corresponding to the target vectors r1 to r3 and the element types c1 to c4 are classified. In the cluster P2, the nodes corresponding to the target vectors r4 to r6 and the element types c5 to c10 are classified. The graph shown in FIG. 9 corresponds to a case in which the target vectors r1 to r3 are classified in the cluster P1, and the target vectors r4 to r6 are classified in the cluster P2.

Note that, the method of dividing the graph is not limited to the method described above. The cluster classification unit 53 may, using another known method, classify the target vectors into clusters by dividing the graph so that the dispersion condition is satisfied and the sum of the costs of the edges is at a minimum. Setting the sum of the costs of the edges to a minimum decreases dependency among the plurality of clusters, and strengthens the association among the nodes belonging to each of the clusters with each other. Therefore, the probability of the target vectors belonging to a given cluster being similar to each other increases.

When the nodes have been classified into clusters, the cluster classification unit 53 stores information on the target vectors belonging to each cluster in the vector storage unit 72 (Step S104).

FIG. 10 is a diagram for showing an example of information on the clusters to which characteristic vectors belong stored in the vector storage unit 72. The information on the clusters to which characteristic vectors belong is information in which a characteristic vector is associated with the cluster to which the characteristic vector belongs. FIG. 10 corresponds to FIG. 9, and the characteristic vectors are classified into clusters in which the corresponding nodes are classified.

The index generation unit 54 is mainly realized by the processor 11 and the storage unit 12. The index generation unit 54 is configured to generate an index for searching for target vectors based on a query vector, and store the target vectors in the index storage unit 73.

The index generation unit 54 generates, as an index, an inverted index for each of the plurality of clusters based on the target vectors belonging to the clusters, and stores the generated inverted indices in the index storage unit 73 (Step S105). The index storage unit 73 stores, for each of the plurality of clusters, an inverted index calculated based on all of the target vectors belonging to that cluster.

FIG. 11 is a diagram for showing an example of an inverted index. FIG. 11 is a diagram for showing the inverted indices of the clusters P1 and P2 when the target vectors shown in FIG. 4 have been classified into the clusters P1 and P2 shown in FIG. 10. An inverted index is an index used when searching for target vectors based on the element type as a key. Therefore, the inverted indices include, as key items, identification information on the clusters and the element types. Further, the inverted indices include pairs consisting of identification information and an element value for each of the target vectors having a value for that cluster and element type.

Further, the index generation unit 54 stores, as an index, information representing a characteristic of each cluster for use in selection of the cluster in the index storage unit 73 (Step S106). The information representing a characteristic of the clusters may be stored in the index storage unit 73 by, for example, the index generation unit 54 associating, based on the node of the element type belonging to each cluster classified by the cluster classification unit 53 in Steps S201 to S210, the element type corresponding to the node with the cluster. Further, the index generation unit 54 may generate a cluster center, such as a center of gravity of the target vectors belonging to the cluster, as information representing the characteristic of the cluster, and store the center of each cluster in the index storage unit 73.

FIG. 12 is a diagram for showing an example of information on a cluster to which an element type belongs that is stored in the index storage unit 73. The information on a cluster to which an element type belongs is information in which the cluster is associated with the element type belonging to the cluster. In FIG. 12, which corresponds to FIG. 9, the element types are classified into the clusters in which the corresponding nodes are classified. Note that, processing for creating the inverted index is known, and hence a detailed description thereof is omitted here.

Figure 13:
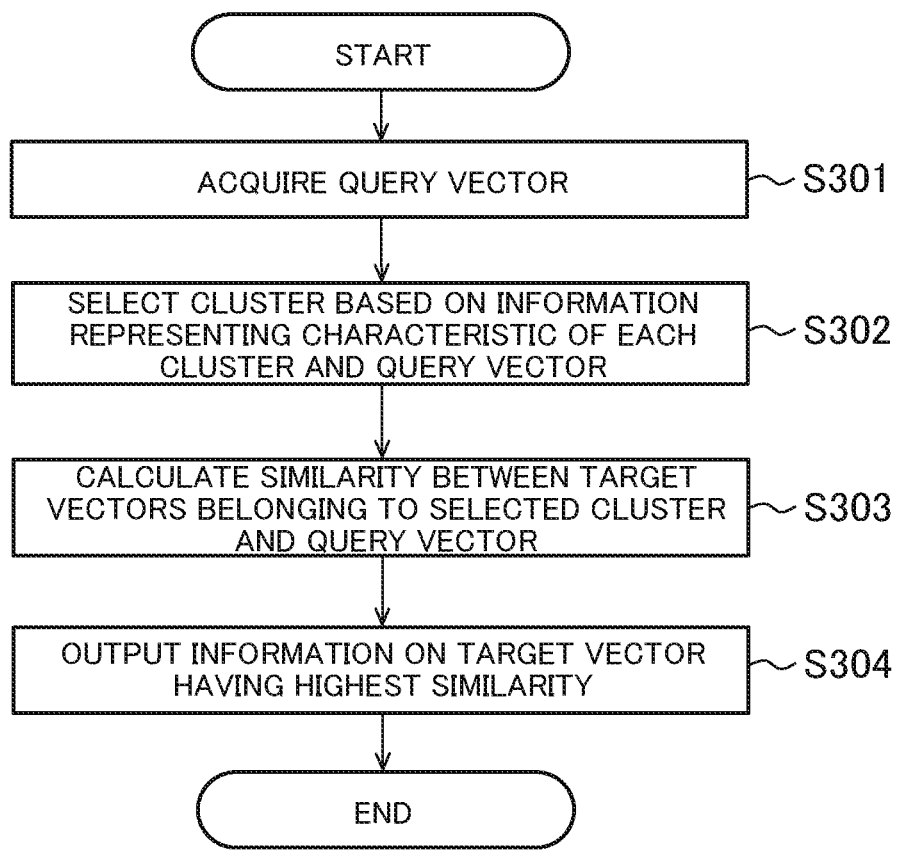
FIG. 13 is a diagram for illustrating an example of a flow of processing for searching for target vectors similar to a query vector.

FIG. 13 is a diagram for illustrating an example of processing for searching for target vectors similar to a query vector. The query vector acquisition unit 55, the cluster selection unit 56, and the similarity calculation unit 57 are now described along with this processing flow.

The query vector acquisition unit 55 is mainly realized by the processor 11, the storage unit 12, the communication unit 13, and the like. The query vector acquisition unit 55 acquires the query vector representing the search condition that the user issued an instruction for by generating a query vector (Step S301). The query vector acquisition unit 55, for example, acquires information on an electronic document, the user, and the like, as instructed by the user from a user terminal and the like connected via a network, and generates the query vector based on the information on the electronic document, the user, and the like. The method of generating the query vector by the query vector acquisition unit 55 is the same as the method of generating the target vectors based on information on an electronic document, the user, and the like, by the target vector acquisition unit 51. Note that, the query vector acquisition unit 55 may also acquire the query vector by receiving a query vector generated by another computer.

The cluster selection unit 56 is mainly realized by the processor 11 and the storage unit 12. The cluster selection unit 56 selects a cluster including target vectors similar to the query vector from among the plurality of clusters based on information representing a characteristic of the clusters generated by the index generation unit 54 and stored in the index storage unit 73, and the query vector (Step S302).

The cluster selection unit 56 is configured to, when information on the element types associated with the clusters, such as that shown in FIG. 12, is stored as the information representing a characteristic of the clusters, calculate, among the elements in the query vector, the sum of the values of the elements of the element types associated with the clusters as a cluster score. For example, regarding the cluster P1 in the example shown in FIG. 12, the sum of the values of the four elements of the query vector, $c_1$, $c_2$, $c_3$, and $c_4$, is calculated as the score for the cluster P1, and regarding the cluster P2, the sum of the values of the elements $c_5$ to $c_{10}$ of the query vector is calculated as the score for the cluster P2. Further, the cluster selection unit 56 is configured to select the cluster having the largest score. Note that, when information representing a cluster center is stored as the information representing a characteristic of the clusters, the cluster selection unit 56 calculates the distance between the center of the clusters and the query vector, and select the cluster having the smallest distance. In the former case, the amount of calculation required to select the cluster can be reduced by using information on an element type strongly associated with the cluster to select the cluster. Further, when classifying into clusters by graph division using a bipartite graph such as that shown in FIG. 5, the index is created more easily.

The similarity calculation unit 57 is mainly realized by the processor 11 and the storage unit 12. The similarity calculation unit 57 calculates the similarity between each of all of the target vectors belonging to the selected cluster and the query vector (Step S303). In this embodiment, the similarity calculation unit 57 is configured to calculate the similarity between the target vectors belonging to the cluster and the query vector based on the inverted index of the selected cluster stored in the index storage unit 73. Specifically, first, the similarity calculation unit 57 initializes an integration variable representing the value of the similarity for each of the plurality of target vectors belonging to the cluster. Next, the similarity calculation unit 57 uses the inverted index to acquire, for each of the plurality of elements having a value set in the query vector, the target vectors corresponding to the element (the target vectors which have the element whose value is not 0) and the value of the element of the target vectors, calculates the TF-IDF values based on the values of those elements when the values of those elements of the target vectors are in terms of TF, and adds the integral of the values of the element of the query vector and the TF-IDF value or the value of the element to the integration variable of those target vectors. When this processing is carried out, the integration variable of each of the target vectors (corresponding to the inner product between the query vector and the target vectors) is the similarity value. Note that, the similarity calculated by the similarity calculation unit 57 may be a cosine similarity between the query vector and each of the target vectors belonging to the selected cluster. When vectors normalized in advance are used as the target vectors and the query vector, the value of the integration variable using the above-mentioned inverted index is equivalent to the value of the cosine similarity.

In this case, the calculation amount (corresponding to the cluster calculation amount) required to calculate the similarity when searching for target vectors using the inverted index depends on the number of target vectors having a non-zero element value among the plurality of elements having a value set in the query vector. When it is not known what kind of elements are set in the query vector, and hence considered that all of the values of the elements of the reference query vector are the same, the cluster calculation amount may be considered to depend on the number of elements having a non-zero value for the plurality of target vectors. Looking at this from the perspective of the target vectors, the number of elements having a non-zero value included in the target vectors is the estimated amount contributing to the cluster calculation amount when those target vectors belong to the cluster. Further, this estimated amount is equivalent to the estimated amount of the calculation amount when calculating the similarity between the target vectors and the reference query vector. The vector contribution amount calculation unit 52 is configured to calculate this estimated amount. Note that, when it is predicted that in the query vector the appearance frequency of each of the elements is different, the cluster calculation amount may depend on the sum of the values obtained by multiplying, for each of the elements of the query vector, the appearance frequency of the elements by the number of target vectors having a non-zero element value. Therefore, the vector contribution amount calculation unit 52 may also calculate the estimated amount based on the assumption that the appearance frequency is set for each of the elements of the reference query vector.

When the similarity between the target vectors and the query vector has been calculated, the similarity calculation unit 57 specifies the target vector having the largest calculated similarity, and outputs information on the specified target vector (Step S304). The information on the target vector may be information on the target vector itself, or may be information on the original document and the like from which the target vector is generated. Further, the similarity calculation unit 57 may output information on the document and the like to display output means connected to the similarity search server, or may transmit information on the document and the like to a user terminal and the like via a network.

In this case, it is not required that the method of dividing the plurality of target vectors into clusters by the cluster classification unit 53 while reducing the difference in cluster calculation amounts among the clusters be a graph division method.

For example, the cluster classification unit 53 may be configured to classify the target vectors into a plurality of clusters based on an evaluation value obtained from the sum of the variance of cluster calculation amounts and a value obtained by multiplying the reciprocal of the average distance among the cluster centers by a coefficient. More specifically, this may be carried out by repeating a process in which, after dividing the target vectors into clusters based on a k-means method, an evaluation value is calculated for when two target vectors belonging to different clusters from each other are replaced, and when the calculated evaluation value is smaller than the pre-replacement evaluation value, the two target vectors are actually replaced. Further, an evaluation value for not only when the target vectors are replaced, but also for when the target vectors are moved from a cluster having a large cluster calculation amount to a cluster having a small cluster calculation amount may be calculated, and when the evaluation value is smaller than the previous evaluation value, the actual target vectors may be moved.

In addition, classification may be carried out by repeating a process in which, after dividing the target vectors into clusters based on a k-means method, when there are a first cluster having a cluster calculation amount exceeding an upper limit determined in advance and a second cluster adjacent to the first cluster, the target vectors having the smallest difference between the distance from the center of the first cluster and the distance from the center of the second cluster is moved from the first cluster to the second cluster. Even when classification is carried out based on this method, the cluster classification unit 53 can divide the plurality of target vectors into clusters while reducing the difference in cluster calculation amounts among the clusters.

The invention claimed is:

1. A similarity calculation system for increasing the efficiency of a computer when performing searching, comprising:
   at least one processor; and
   at least one memory device that stores a plurality of instructions, which when executed by the at least one processor, causes the at least one processor to operate to:
   acquire a query vector;
   acquire a plurality of target vectors;
   calculate a similarity between each of the plurality of target vectors belonging to any one of the plurality of clusters and the query vector,
   calculate, for each of the plurality of target vectors, a calculation amount to be estimated when calculating the similarity between the each of the plurality of target vectors and the query vector,
   cluster the plurality of target vectors based on the calculation amount to be estimated for each of the plurality of target vectors,
   wherein, in the calculation, the processor calculates a number of non-zero elements of each of the plurality of target vectors as the estimated calculation amount,
   wherein, in the clustering, the processor clusters the plurality of target vectors so that a difference in a total sum of the calculated calculation amounts for all of the plurality of target vectors belonging to each of the plurality of clusters among the plurality of clusters decreases,
   wherein, in the clustering, the processor clusters the plurality of target vectors by generating a graph comprising:
      a plurality of first nodes that correspond to each of the plurality of target vectors and that has the calculation amount estimated for a corresponding one of the plurality of target vectors as a weight,
      a plurality of second nodes corresponding to an element type of the plurality of target vectors, and
      a plurality of edges connecting each of the plurality of first nodes to any one of the plurality of second nodes, and by dividing the generated graph based on the weight of each of the plurality of first nodes.

2. The similarity calculation system according to claim 1, wherein the processor clusters the plurality of target vectors so that a difference in a total calculation amount among a plurality of clusters decreases,
   wherein the total calculation amount being estimated for each of the plurality of clusters is based on a calculation amount estimated for each of the plurality of target vectors belonging to the each of the plurality of clusters.

3. The similarity calculation system according to claim 1,
   wherein each of the plurality of edges comprises a cost that is based on a value of an element of the target vector corresponding to a corresponding one of the plurality of edges, and
   wherein the processor clusters the plurality of target vectors by dividing the generated graph based further on the cost of each of the plurality of edges.

4. The similarity calculation system according to claim 1, further comprising the processor being caused to:
   select, based on the element type corresponding to the second node classified into the plurality of clusters by the processor and on the query vector including a plurality of elements, the cluster for which the similarity between the query vector and each of the plurality of target vectors is to be calculated,
   wherein the processor calculates the similarity between each of the plurality of target vectors belonging to the cluster selected by the processor and the query vector.

5. A method of calculating a similarity among target vectors for increasing the efficiency of a computer when performing searching, comprising:
   acquiring a query vector;
   acquiring, with at least one processor operating with a memory device in a server, a plurality of target vectors;
   calculating a similarity between each of the plurality of target vectors belonging to any one of the plurality of clusters and the query vector,
   calculating, for each of the plurality of target vectors, a calculation amount to be estimated when calculating the similarity between the each of the plurality of target vectors and the query vector, by calculating a number of non-zero elements of each of the plurality of target vectors as the estimated calculation amount;
   clustering, with the at least one processor operating with the memory device in the server, the plurality of target vectors based on the calculation amount to be estimated for each of the plurality of target vectors such that the processor clusters the plurality of target vectors so that a difference in a total sum of the calculated calculation amounts for all of the plurality of target vectors belonging to each of the plurality of clusters among the plurality of clusters decreases,
   clustering the plurality of target vectors b generating a graph, the graph comprising:
      a plurality of first nodes that correspond to each of the plurality of target vectors and that has the calculation amount estimated for a corresponding one of the plurality of target vectors as a weight,
      a plurality of second nodes corresponding to an element type of the plurality of target vectors, and
      a plurality of edges connecting each of the plurality of first nodes to any one of the plurality of second nodes, and by dividing the generated graph based on the weight of each of the plurality of first nodes.

6. A computer-readable non-transitory storage medium storing a plurality of instructions for calculating a similarity among target vectors for increasing the efficiency of a computer when performing searching, wherein when executed by at least one processor, the plurality of instructions cause the at least one processor to:
   acquire a query vector;

acquire a plurality of target vectors;
calculate a similarity between each of the plurality of target vectors belonging to any one of the plurality of clusters and the query vector,
calculate, for each of the plurality of target vectors, a calculation amount to be estimated when calculating the similarity between the each of the plurality of target vectors and the query vector,
cluster the plurality of target vectors based on the calculation amount to be estimated for each of the plurality of target vectors,
wherein, in the calculation, the processor calculates a number of non-zero elements of each of the plurality of target vectors as the estimated calculation amount,
wherein, in the clustering, the processor clusters the plurality of target vectors so that a difference in a total sun of the calculated calculation amounts for all of the plurality of target vectors belonging to each of the plurality of clusters among the plurality of clusters decreases,
wherein, in the clustering, the processor clusters the plurality of target vectors by generating a graph comprising:
a plurality of first nodes that correspond to each of the plurality of target vectors and that has the calculation amount estimated for a corresponding one of the plurality of target vectors as a weight,
a plurality of second nodes corresponding to an element type of the plurality of target vectors, and
a plurality of edges connecting each of the plurality of first nodes to any one of the plurality of second nodes, and by dividing the generated graph based on the weight of each of the plurality of first nodes.

* * * * *